T. DUNN.
PNEUMATIC TIRE.
APPLICATION FILED NOV. 25, 1910.
997,443.
Patented July 11, 1911.
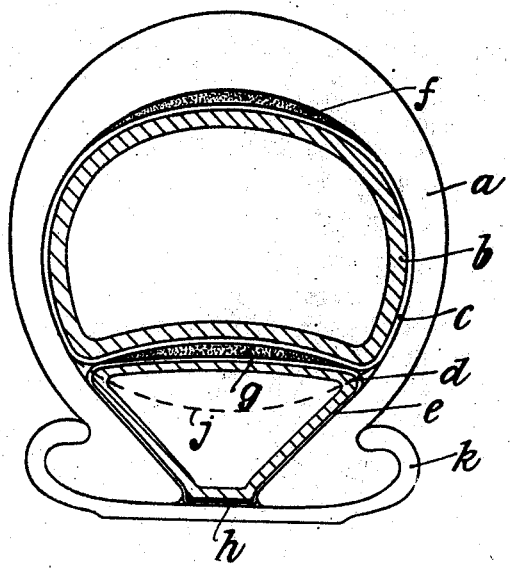
Witnesses:
Inventor
Thomas Dunn
by Herbert W. Jenner
Attorney.

UNITED STATES PATENT OFFICE.

THOMAS DUNN, OF LONDON, ENGLAND.

PNEUMATIC TIRE.

997,443.  Specification of Letters Patent.  Patented July 11, 1911.

Application filed November 25, 1910. Serial No. 594,133.

*To all whom it may concern:*

Be it known that I, THOMAS DUNN, residing at 56 Moorgate street, in the city of London, England, have invented certain new and useful Improvements in Pneumatic Tires; and I do hereby declare the following to be a full, clear, and exact description of the invention, such as will enable others skilled in the art to which it appertains to make and use the same.

This invention has for its object an improved method of reinforcing the air tubes of pneumatic tires, so that, by so supporting the fabric of the cover, and distributing the strains to which it is subject in use, that its liability to failure will be greatly reduced and its life greatly prolonged, all the chief causes of tire trouble may be avoided, and that covers too worn or damaged to admit otherwise of further use may be made to yield to a new lease of life, probably longer even than their first when used with ordinary unsupported tubes.

When an ordinary tube is inflated with an ordinary outer cover, it is considerably distended both laterally and circumferentially, and that portion which lies between the toes of the beads is stretched to a far greater extent than the rest of the tube which abuts closely against the inside of the outer cover, indeed to an excessive degree, and there is always the danger of this base portion of the tube perishing through this excessive distention after the tube has been in use for some time. Now, according to the present invention, means are arranged whereby, in particular, any excessive distention of the inner tube is prevented, and it is relieved of this unequal strain, whereby the life of the tube is prolonged, while the construction also provides for absolute security in keeping the heels of the beads within the channel of the rim even after deflation.

The drawing shows a cross-section through a pneumatic tire constructed according to this invention.

In the drawings $a$ is the outer cover, and $b$ is an ordinary inner tube. The tube is unjoined and drawn into an inextensible pocket $c$. One means of making this pocket $c$ is to wind a linen or other textile thread upon a collapsible mandrel that is first covered with a thin rubber proofed Holland or similar suitable fabric, the threads being previously repeatedly passed through rubber solution so that they will adhere securely the one to the other and to the interior skin of the fabric. The pocket thus made is then stripped from the mandrel and the unjoined tube is drawn through it and its ends rejoined. The tube is then slightly inflated and around the tread portion of the pocket are wound circumferentially a series of inextensible threads $f$, strong enough to render the tread practically inextensible in use, or a material may be applied to the outer portion having the same effect, the thread or its equivalent and the exposed surface of the pockets being finally wrapped and vulcanized in the usual way. The tube so covered will only occupy about three quarters of the space within the outer cover, and, in order to insure the whole of such space being filled, a secondary inner tube $d$ is provided, which tube is also provided with an inextensible pocket $e$, which pocket has a circumferentially wound inextensible band $g$ upon its outer portion, this portion being rubber solutioned to the inner circumference of the larger tube pocket $c$. This smaller or secondary tube prevents the heels of the cover beads from disengaging themselves from the channels of the rim even should the larger tube deflate; and, to obviate this trouble arising should the smaller secondary tube by any chance deflate, the outer covering of the secondary tube $e$ is made of a double thickness at its base and is adapted to inclose a sectional steel band $h$.

A communication for inflation may be made between the two air tubes in which case a single valve will suffice for both. On the other hand the secondary tube may be, and preferably is, made butt ended, the larger tube and the smaller tube being in this case each provided with a valve for inflation. If this latter method is adopted the valves may be placed diametrically opposite one another, the valve of the larger tube being placed between the butted ends of the smaller tube. Since neither tubes are extensible laterally or only very slightly so, the larger tube, if not supported by the secondary tube would take up the position as shown in dotted lines at $j$; but, when the smaller secondary air tube is provided and inflated, it forces the inner side of the larger tube upward the meeting surfaces of the two tubes forming a diaphragm across the section of the tire, and the air pressure by forcing the base of the secondary tube down into the channel at the base of the outer cover between the beads automatically sets the two tubes with the inextensible band in the tread in their correct position within the cover.

The steel band $h$ assists the tube as a whole automatically to find its exactly correct position within the cover. The band need not necessarily be made in one continuous strip but may be made in several pieces and the ends made to overlap.

Should the outer cover be cut or burst, even to such an extent as to expose the circumferentially inextensible band on the tube below, no damage will accrue to the inner tube, so long as the tube cover does not come into contact with the road surface, as the laterally wound threads constituting the pocket prevent the tube from forcing itself through into any aperture in the outer cover. The circumferential threads in the tread distribute the strains to which the covers are subject in use, both the circumferential strains due to the drive of the engine and the action of the brake, and the lateral strains due to the swaying of the vehicle, so that the severity of their action on the fabric is greatly reduced. They also keep the tread of the tire true both laterally and radially whatever may happen to the cover, and are absolute preventative of creeping, for, since the cover is fully distended by the two tubes, and the beads being firmly held in the channels of the rim $k$ by the action of the secondary tube, no such motion is possible.

I claim:—

The combination, with a wheel rim, and a tire cover engaging therewith; of a pneumatic tire arranged in the upper part of the tire cover with its lower part extending crosswise between the sides of the cover and adapted to form a diaphragm across the cover, and a packing comprising a pneumatic tube provided with a cover of inelastic material having a reinforcing band at its periphery, said packing having a cross-section of substantially triangular outline, arranged between the said tire and rim with two of its sides bearing against the end portions of the tire cover and operating to reinforce the said diaphragm.

In testimony whereof I affix my signature, in presence of two witnesses.

THOMAS DUNN.

Witnesses:
H. D. JAMESON,
S. E. BOURE.